United States Patent [19]

Sasaki

[11] Patent Number: 5,671,710
[45] Date of Patent: Sep. 30, 1997

[54] PISTONS FOR INTERNAL COMBUSTION ENGINES AND METHOD OF MANUFACTURING SAME

[75] Inventor: Masato Sasaki, Atsugi, Japan

[73] Assignee: Unisia Jecs Corporation, Atsugi, Japan

[21] Appl. No.: 534,117

[22] Filed: Sep. 26, 1995

[30] Foreign Application Priority Data

Sep. 26, 1994 [JP] Japan .................. 6-228548

[51] Int. Cl.$^6$ .................................................. F02F 3/00
[52] U.S. Cl. .................................................. 123/193.6
[58] Field of Search .................. 123/193.6; 29/888.046, 29/888.049, 888.04; 92/254, 213, 222, 224

[56] References Cited

U.S. PATENT DOCUMENTS

| | | | |
|---|---|---|---|
| 4,643,078 | 2/1987 | Ban | 123/193.6 |
| 4,651,631 | 3/1987 | Avezou | 123/193.6 |
| 4,987,867 | 1/1991 | Suzuki | 123/193.6 |
| 4,989,556 | 2/1991 | Shiina et al. | |
| 5,119,777 | 6/1992 | Mielke et al. | 123/193.6 |
| 5,425,306 | 6/1995 | Binford | 123/193.6 |
| 5,505,171 | 4/1996 | Gazzard | 123/193.6 |
| 5,507,258 | 4/1996 | Sasaki | 123/193.6 |

FOREIGN PATENT DOCUMENTS

| | | |
|---|---|---|
| 59-201953 | 11/1984 | Japan . |
| 1-190951 | 8/1989 | Japan . |
| 2-101141 | 4/1990 | Japan . |
| 2-125952 | 5/1990 | Japan . |
| 3-30708 | 5/1991 | Japan . |

OTHER PUBLICATIONS

Yamamoto et al., "Development of A Piston With Locally Cut-Alloyed Ring Groove", *Electron Beam Fusion Treatment*, Technical Revue No. 1, pp. 103–109, (1988).

Hawajima et al., "Development of In-Site Hybrid HHC for High Performance Diesel Engine Pistons", *Automotive Technique No. 891, 056*, pp. 231–234, (1989).

"F3S and F3K Composites", Duralcan Catalog F3K 20S.

*Primary Examiner*—Marguerite McMahon
*Attorney, Agent, or Firm*—Foley & Lardner

[57] ABSTRACT

A piston for an internal combustion engine comprises a wear resisting annulus disposed on a top ring groove and made of aluminum alloy containing SiC particulates and an interface between the wear resisting annulus and the top ring groove, the interface being remelted and solidified.

19 Claims, 14 Drawing Sheets

SiC

FIG. 7B

SiC

PISTON MAIN BODY
ALUMINUM ALLOY
NOT MELTED

REMELTED
PORTION BY
ELECTRON BEAM

COMPONENTS OF MATRIX ALUMINUM ALLOY (wt%)

| Si | Fe | Cu | Mg | Ni | Ti | Al |
|---|---|---|---|---|---|---|
| 10.3 | 0.2 | 3.0 | 1.15 | 1.25 | 0.2 | REM. |

FIG.14

EVALUATION RESULTS

| ADDITIONAL AMOUNT OF SiC PARTICULATES (% BY WEIGHT) | WEAR-RESISTANCE | MICRO-WELD. RESISTANCE | MACHINABILITY |
|---|---|---|---|
| 0 | 100 | 100 | 100 |
| 5 | 6 | 10 | 20 |
| 10 | 3 | 0 | 15 |
| 15 | 3 | 0 | 12 |
| 20 | 3 | 0 | 10 |
| 25 | 2 | 0 | 2 |
| 30 | 2 | 0 | IMPOSSIBLE MACHINING |

COMPONENTS OF MATRIX ALMINUM ALLOY

|  | Si wt% | Cu wt% | Mn wt% | Ni wt% | Mg wt% | SiC PARTIC vol% |
|---|---|---|---|---|---|---|
| DURALCAN | 10 | 3 | 0.3 | 1.2 | 1.0 | 20 |
|  | ↓ | ↓ | ↓ | ↓ | ↓ | ↓ |
| TARGET CONTENT | 14 | 35 | 1.5 | 3 | 1.0 | 20 |

FIG.17

PISTONS FOR INTERNAL COMBUSTION ENGINES AND METHOD OF MANUFACTURING SAME

BACKGROUND OF THE INVENTION

The present invention relates to an improvement of pistons for internal combustion engines for motor vehicles, etc.

In recent years, pistons for internal combustion engines for motor vehicles are made of aluminum alloy instead of cast iron so as to achieve a weight reduction in view of requirements of high power and high performance. Grooves for receiving piston rings are formed on an outer peripheral surface of the piston which faces an inner wall of a cylinder bore. A top ring groove, the nearest one of the piston ring grooves with respect to a combustion chamber, suffers great wear by a piston ring (top ring) due to exposure to a high temperature and direct receiving of a combustion pressure in particular. Thus, aluminum micro-welding is apt to occur between the top ring groove and the top ring.

Various techniques have been proposed to prevent such aluminum micro-welding: 1) Reinforcement of the surface of the top ring groove by compounding inorganic fiber aggregate (see JP-A 59-201953); 2) Application of hybrid MMC (metal matrix composites) by In-Situ process to the pistons (see Automotive Technique No. 891,056 published in May, 1989 by Automotive Technique Society); 3) Reinforcement of the surface of the top ring groove by compounding nickel porous material (see JP-B2 3-30708); 4) Reinforcement of the surface of the top ring groove by an alumilite layer (see JP-A 1-190951); 5) Formation of a copper-alloy layer by electron beam fusion treatment on the surface of the piston ring groove (see Technical Revue No. 1 published in 1988 by Mitsubishi Motor Co., Ltd. and JP-A 2-125952, and; 6) Formation of a ring support portion in the top ring groove by casting aluminum alloy around Ni-resist cast iron as alfin-treated.

However, the above prior arts present the following inconveniences: The prior arts 1)–3) need the use of a high-pressure solidification method in view of applied materials such as inorganic fiber, etc. with respect to a forming method. This results in a rise of manufacturing cost and a restriction of the piston shape.

The prior art 4) contributes to an improvement of micro-welding resistance with the piston ring due to presence of the alumilite layer, but fails to provide sufficient wear resistance. On the contrary, the prior art 5) may fail to provide sufficient micro-welding resistance.

The prior art 6), a technique being applied from long ago, ensures wear resistance and micro-welding resistance, but cannot avoid a weight increase due to cast iron making.

Additionally, JP-A 2-101141 proposes the other solution which provides high-strength matrix aluminum alloy obtained by adding to aluminum alloy Si, Cu, Mg, Fe, and Mn by a predetermined percent by weight, respectively then dispersing one of hard particulates such as $Al_2O_3$ therein. However, if this material is remelted by a heat source of high energy density, a blow hole may be produced in a remelted portion upon joining thereof due to air existing inevitably between powder particulates, and remaining up to final forming.

It is, therefore, an object of the present invention to provide pistons for internal combustion engines which provide sufficient wear resistance and micro-welding resistance without any increase in weight and manufacturing cost.

SUMMARY OF THE INVENTION

According to one aspect of the present invention, there is provided a piston for an internal combustion engine, comprising:

a main body made of aluminum alloy;

groove means for defining a plurality of piston ring grooves on an outer periphery of said main body;

wear resisting means for resisting wear of said groove means, said wear resisting means being made of aluminum alloy containing predetermined particulates; and interface means for interconnecting said groove means and said wear resisting means.

Another aspect of the present invention lies in providing a piston for an internal combustion engine, comprising:

a main body made of aluminum alloy;

groove means for defining a plurality of piston ring grooves on an outer periphery of said main body;

an annulus disposed on said groove means for resisting wear of said groove means, said annulus being made of aluminum alloy containing predetermined particulates; and interface means for interconnecting said groove means and said annulus.

Still another aspect of the present invention lies in providing a method of manufacturing a piston for an internal combustion engine having a main body and at least one ring groove, the method comprising the steps of:

forming a wear resisting annulus out of aluminum alloy containing predetermined particulates;

casting molten aluminum alloy for the main body of the piston around said wear resisting annulus, said wear resisting annulus being positioned to correspond to the ring groove of the piston; and remelting and solidifying an interface between said wear resisting annulus and the main body of the piston.

The other aspect of the present invention lies in providing a piston for an internal combustion engine, comprising:

a main body made of aluminum alloy, said main body containing predetermined components;

groove means for defining a plurality of piston ring grooves on an outer periphery of said main body;

wear resisting means for resisting wear of said groove means, said wear resisting means being made of aluminum alloy containing SiC particulates and said predetermined components, a content of each component being greater than in said main body; and interface means for interconnecting said groove means and said wear resisting means, said interface means including said predetermined components with respect to aluminum alloy of said main body and said wear resisting means:

7.0% by weight$\leq$Si$\leq$28.0% by weight, 10.0% by weight$\leq$Cu$\leq$23.0% by weight, 0.3% by weight$\leq$Mg$\leq$3.5% by weight, and 0.54 by weight$\leq$Mn$\leq$2.9% by weight, aluminum alloy of said main body and said wear resisting means with inevitable impurity containing at least one of particulates of $Al_2O_3$, SiC, $Si_3N_4$, $ZrO_2$, $SiO_2$, $TiO_2$, and metallic Si in a range of 0.5% to 15.0% by weight.

DETAILED DESCRIPTION OF THE INVENTION

Figure 1:
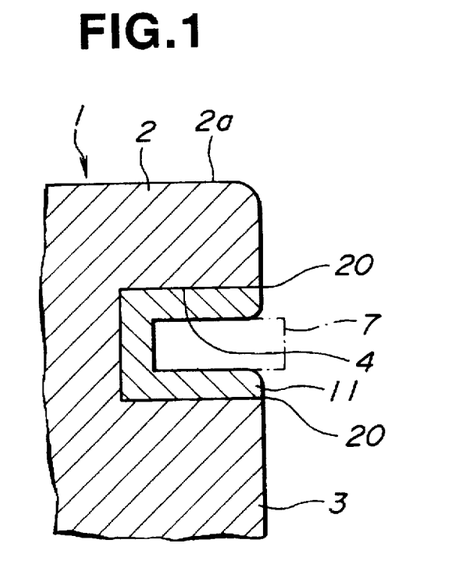
FIG. 1 is a fragmentary enlarged section showing a piston with a top ring groove embodying the present invention.
Figure 2:
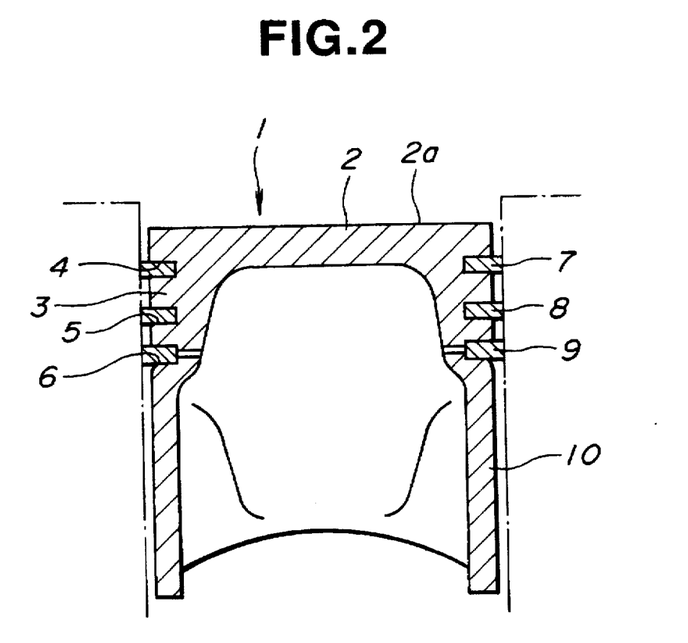
FIG. 2 is a longitudinal section showing the piston.

Referring to FIGS. 1 and 2, a piston includes a piston main body 1 which is made of aluminum alloy (JISAC8A-T6) and shaped substantially like a cylinder and has a crown 2 facing a combustion chamber, three piston ring grooves 4, 5, 6 formed on an outer peripheral surface of a ring land 3 arranged below the crown 2, three piston rings 7, 8, 9 engaged with the piston ring grooves (top, second and oil ring grooves) 4, 5, 6, and a skirt 10 arranged below the piston ring grooves 4, 5, 6.

The top ring groove 4 is formed to have a middle 9 mm distant from a top face of the crown 2, and be 4 mm in width and 8 mm in depth. Additionally, only a surface of the top ring groove 4 is formed by a wear resisting annulus 11 made according to a forming method as will be described later.

The wear resisting annulus 11 is made of aluminum alloy containing silicon carbide (SIC) particulates, and cast within the piston main body 1 so as to form the surface of the top ring groove 4.

The forming method of the wear resisting annulus 11 will be described concretely. First, an aluminum alloy cast ingot containing 10–20% SiC particulates of several micrometers to tens of micrometers in maximum diameter is melted in an inert atmosphere such as argon gas or the like and maintained at 993 K., then subjected to mechanical agitation so as to uniformly disperse SiC particulates in aluminum alloy material.

Figure 3:
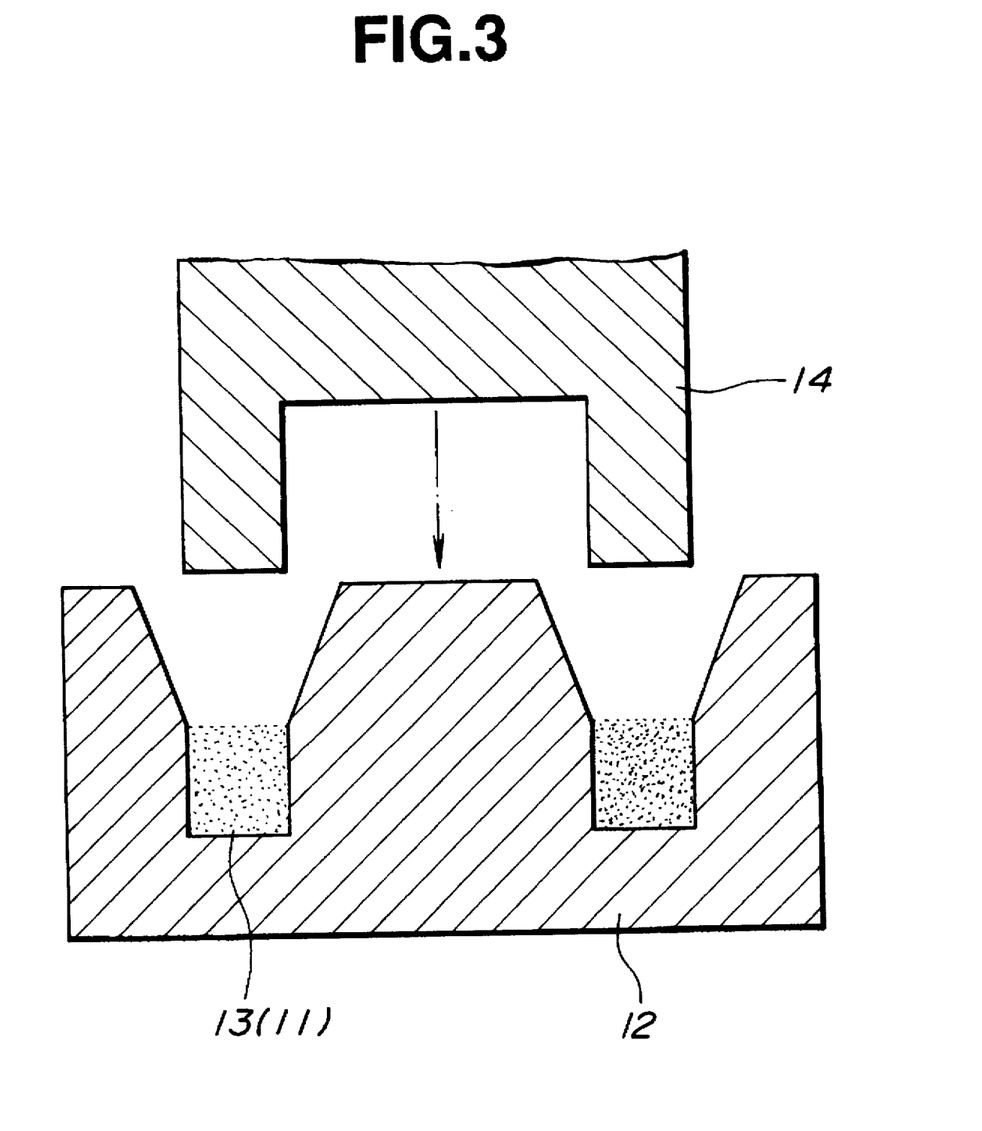
FIG. 3 is a schematic view showing metal molds for a wear resisting annulus for the top ring groove.

Referring to FIG. 3, a molten aluminum alloy 13 containing SiC particulates is injected into a lower mold 12, and pressured by an upper mold 14 for solidification. After cooling, a rough section of the wear resisting annulus 11 is taken out of the lower mold 12. Then, a dead head is cut out, and machining is carried out if necessary, thus completing a forming work of the wear resisting annulus 11. This method is called a molten metal casting method.

Figure 15A:
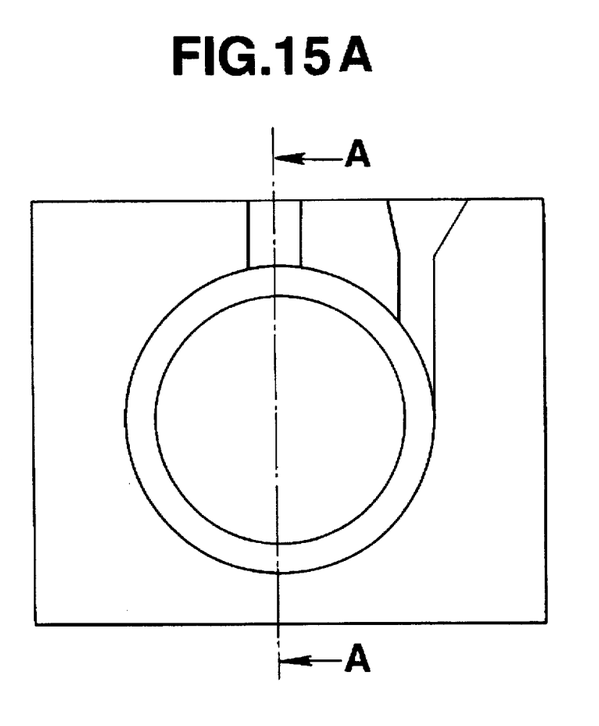
FIG. 15A is a front view showing one metal mold used in a gravity casting method.
Figure 15B:
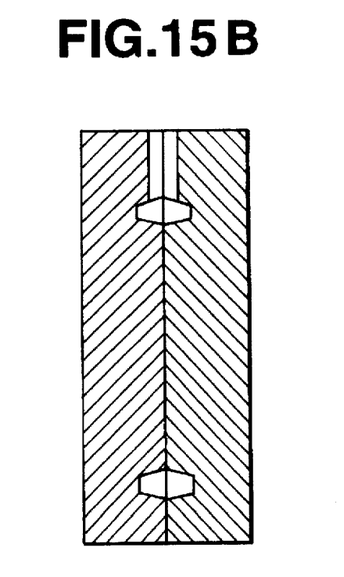
FIG. 15B is a view similar to FIG. 2, taken along the line A—A in FIG. 15A.

Moreover, referring to FIGS. 15A and 15B, the wear resisting annulus 11 having a predetermined shape is obtained with no necessity of machining by injecting molten alloy into the mold as shown in FIGS. 15A and 15B, and cutting out the dead head after solidification. This method is called a gravity casting method.

The rough section of the wear resisting annulus 11 can be made according to a die casting method in addition to the above molten metal casting method and gravity casting method. Moreover, a powder metal forging method is applicable. According to this, SiC particulates are mixed with aluminum alloy particulates, which are charged in a metal mold, and pressured by the upper mold 14 for forming. After heating, forging is carried out to increase the density. When the increased density has not been obtained, forging is repeatedly carried out after reheating. This method allows finishing of a final product shape, necessitating no subsequent machining, resulting in an improved working efficiency.

The wear resisting annulus 11 formed in such a way is cast within the piston main body 1 for fixing. An example of this casting condition is such that a preheating temperature of the wear resisting annulus 11 is 673 K., an injecting temperature of molten alloy of the piston main body 1 is 993 K., a temperature of the molds is 473 K., and a surface of the wear resisting annulus 11 is washed and degreased with an alkali solution, an organic solvent, etc.

When raising a heating temperature of molten alloy or carrying out sufficient preheating of the wear resisting annulus 11, a phenomenon is observed that an interface 20 between the wear resisting annulus 11 and the piston main body 1 is fully deposited. However, due to the highly restricted range of a temperature condition of this deposition, uniform joining is difficult to carry out. According to the present invention, in order to obtain uniform joining, the interface 20 between the two is remelted by a heat source of high energy density such as an electron beam, a TiG laser, etc.

Figure 4A:
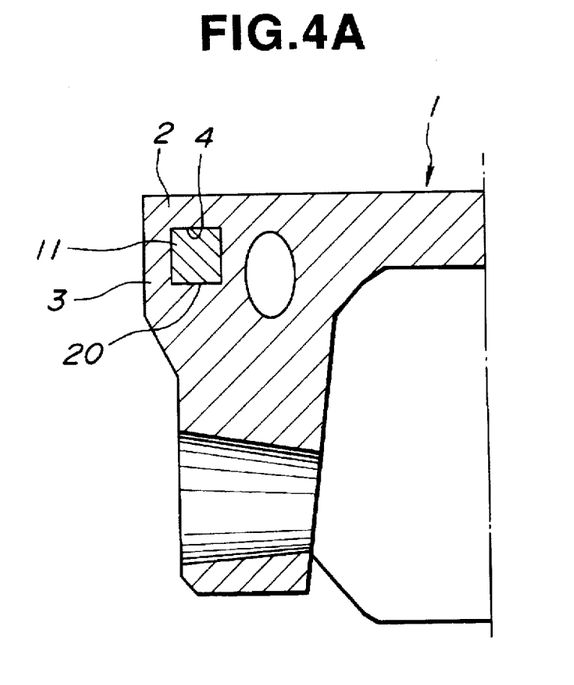
FIG. 4A is a fragmentary section showing a first preferred embodiment of the present invention, with the wear resisting annulus cast within a piston main body.
Figure 4B:
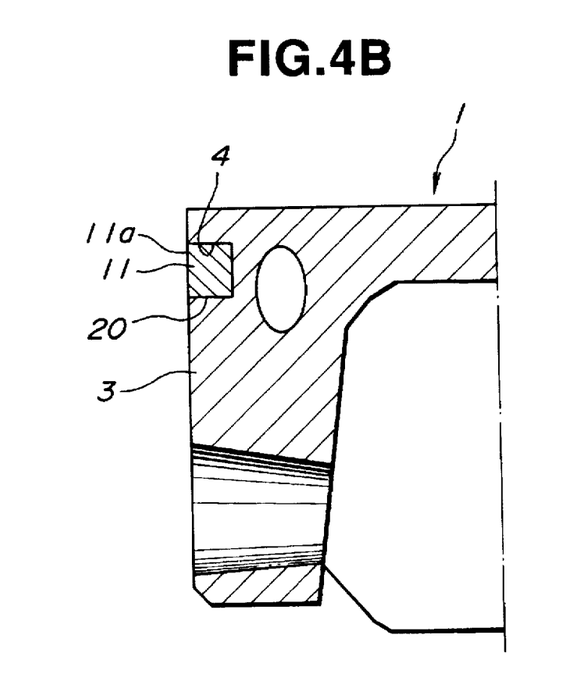
FIG. 4B is a view similar to FIG. 4A, showing the piston with a ring land of a crown cut off.
Figure 5A:
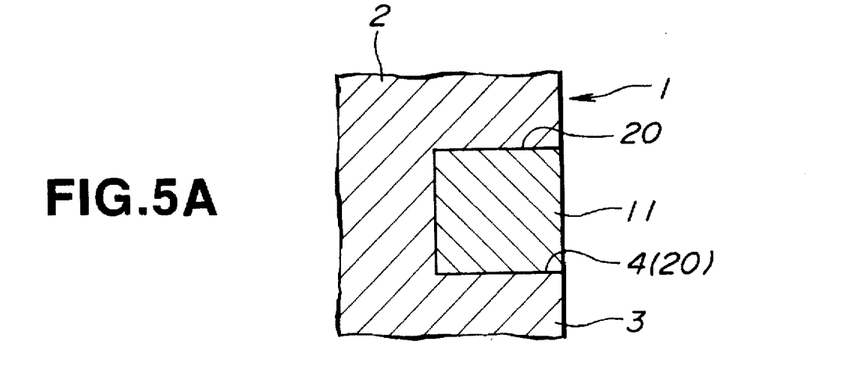
FIG. 5A is a view similar to FIG. 1, showing the wear resisting annulus.
Figure 5B:
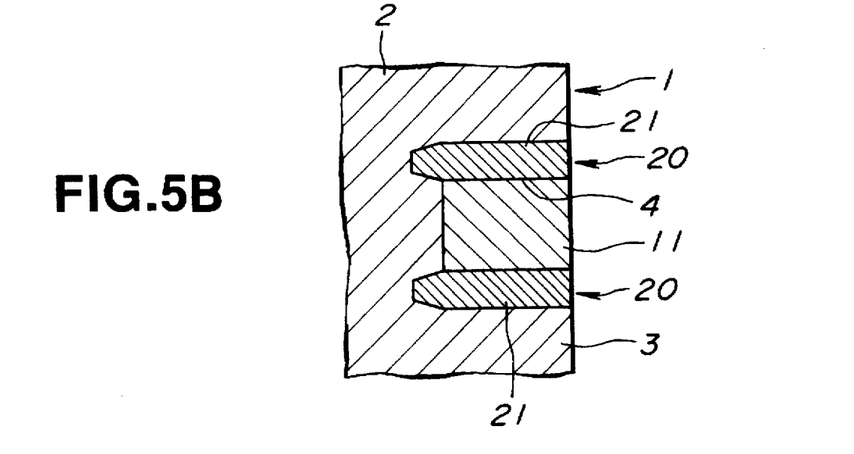
FIG. 5B is a view similar to FIG. 5A, showing a remelted portion between the wear resisting annulus and the piston main body.
Figure 5C:
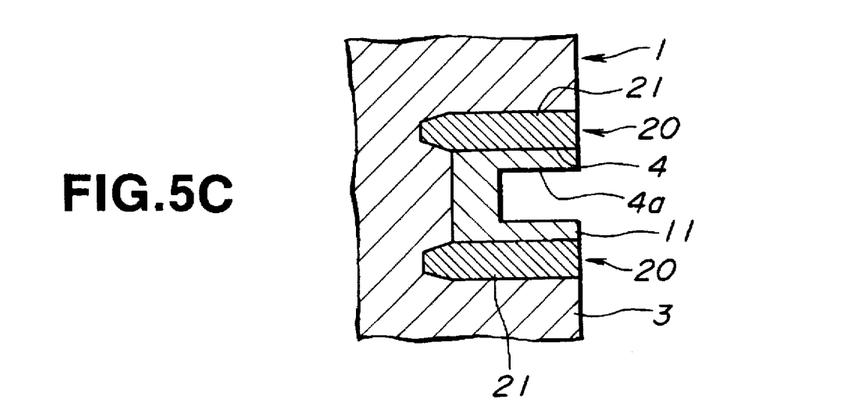
FIG. 5C is a view similar to FIG. 5B, showing the piston with the top ring groove formed in the wear resisting annulus.

Referring to FIGS. 4A–5C, a description will be made with regard to a process of remelting and joining the wear resisting annulus 11 and the piston main body 1. First, the piston main body 1 with the wear resisting annulus 11 cast therein as shown in FIG. 4A is machined to cut off an outer periphery of a ring land 3, exposing an outer peripheral surface 11a of the wear resisting annulus 11 as shown in FIG. 4B. Then, referring to FIGS. 5A and 5B, the interface 20 between an upper or lower side of the wear resisting annulus 11 and an inner surface of the ring land 3 is irradiated and remelted by a high heat source such as a high energy electron beam. Specifically, aluminum alloy of the piston main body 1 and that of the wear resisting annulus 11 are remelted, then, subjected to quick cooling for solidification. Thus, due to such a remelted portion 21, a uniform alloy layer is formed on the interface 20, obtaining a high joining strength. Referring to FIG. 5C, after remelting and strong joining, the wear resisting annulus 11 is machined to annularly form a ring groove 4a in an outer peripheral portion thereof.

Figure 6A:
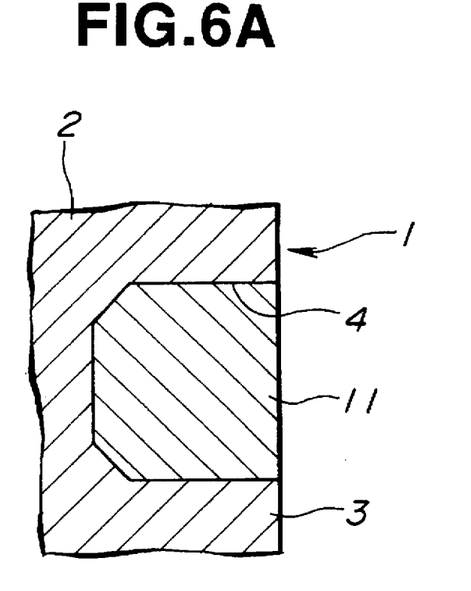
FIG. 6A is a view similar to FIG. 5C, showing a second preferred embodiment of the present invention, with a remelted interface between the wear resisting annulus and the piston main body.
Figure 6B:
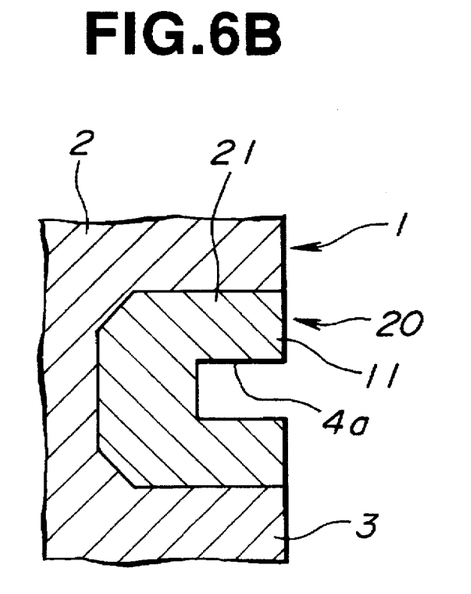
FIG. 6B is a view similar to FIG. 6A, showing the piston with the top ring groove formed in the wear resisting annulus as shown in FIG. 6A.

FIGS. 6A and 6B show a second embodiment of the present invention wherein the entirety of the interface 20 between the wear resisting annulus 11 and the inner surface of the ring land 3 is remelted for joining. Specifically, in the same way as in the first embodiment, after cutting off the outer periphery of the ring land 3, the ring groove 4a is formed in the outer peripheral portion of the wear resisting annulus 11. In the second embodiment also, remelting contributes to strong joining of the wear resisting annulus 11 and the piston main body 1. Particularly, according to the second embodiment, highly uniform dispersion of SiC particulates is obtained in the remelted portion 21. This is due to agitation and quick cooling effects by a high energy electron beam.

Figure 7A:
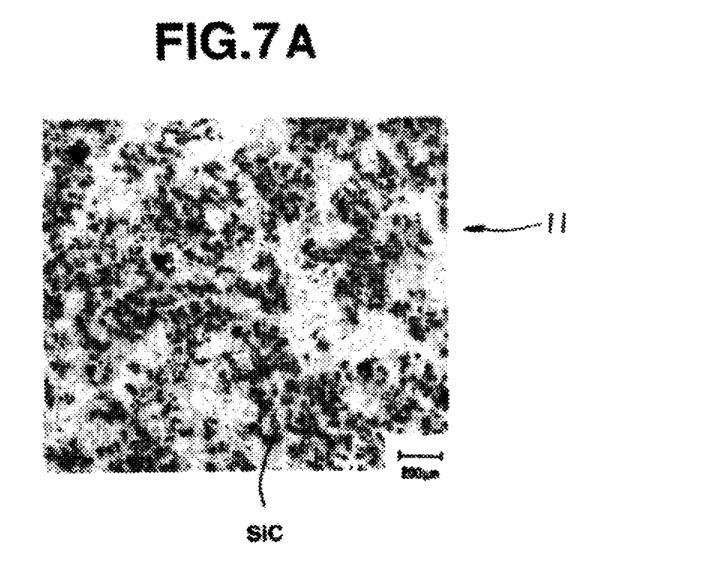
FIG. 7A is a microphotographic view showing a structure of the wear resisting annulus before remelting.
Figure 7B:
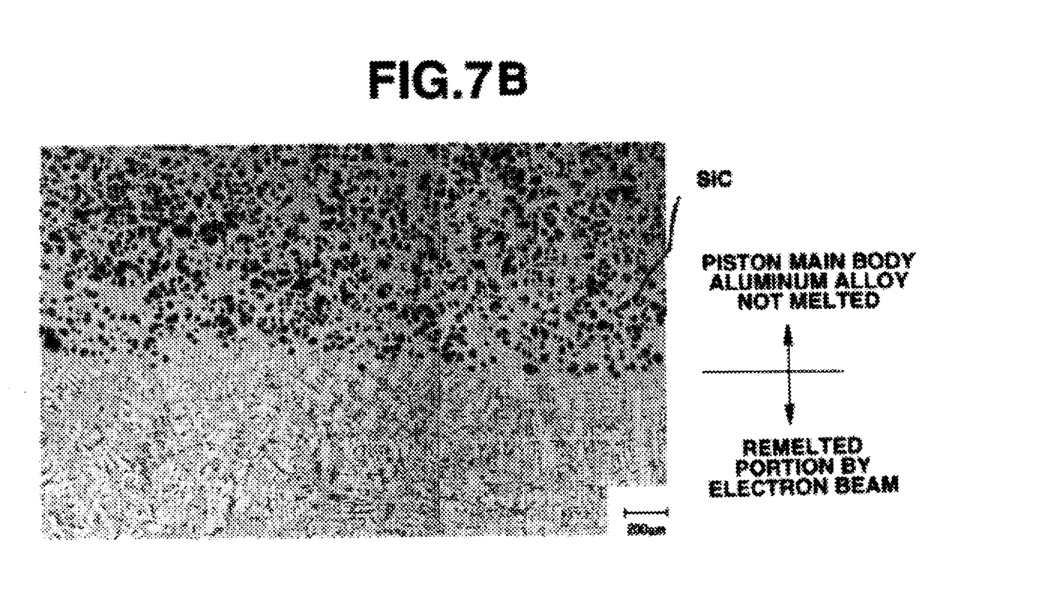
FIG. 7B is a view similar to FIG. 7A, showing a structure of the wear resisting annulus after remelting.

FIG. 7A shows a microphotograph of a structure of a section of the wear resisting annulus 11 before remelting, whereas FIG. 7B shows a microphotograph of a structure of a section of the wear resisting annulus 11 after remelting. Before remelting, as indicated by black spots in FIG. 7A, SiC particulates in aluminum alloy are locally aggregated in the vicinity of the upper and lower sides of the wear resisting annulus 11. On the other hand, after remelting, as indicated by black spots in FIG. 7B, SiC particulates are uniformly dispersed in the entirety of the interface 20, so that aluminum alloy of the wear resisting annulus 11 and that of piston main body 1 are in the homogenous phase, obtaining strong bonding in view of metallography.

Joining of the wear resisting annulus 11 and the piston main body 1 is due to metallic bonding of aluminum alloys of the two after remelting, so that a volume percentage of SiC particulates is slightly decreased in the remelted portion 21. Thus, in the first embodiment or when the ring groove 4a does not participate in the remelted portion 21, no problem is produced, whereas in the second embodiment or when the ring groove 4a participates in the remelted portion 21, the melted amount of aluminum alloy of the piston main body 1 should be decreased so as not to largely lower the volume percentage of SiC particulates. Therefore, the melted amount of aluminum alloy of the piston main body 1 corresponds, preferably, to that at least within about 1 mm from the outer peripheral surface of the wear resisting annulus 11.

Figure 8:
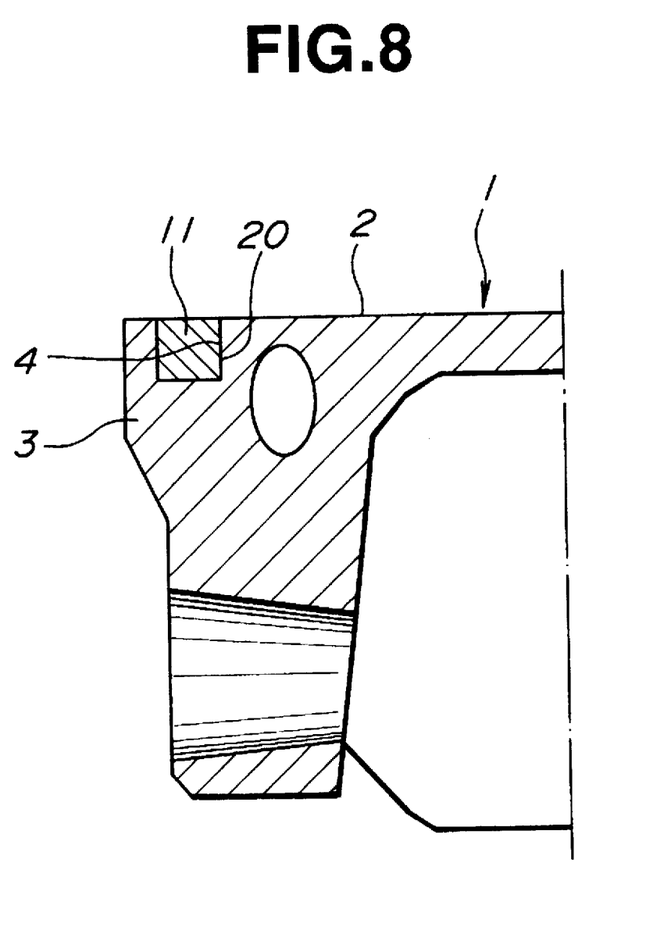
FIG. 8 is a view similar to FIG. 4B, showing a third preferred embodiment of the present invention, with an outer periphery of a top land of the crown cut off.
Figure 9A:
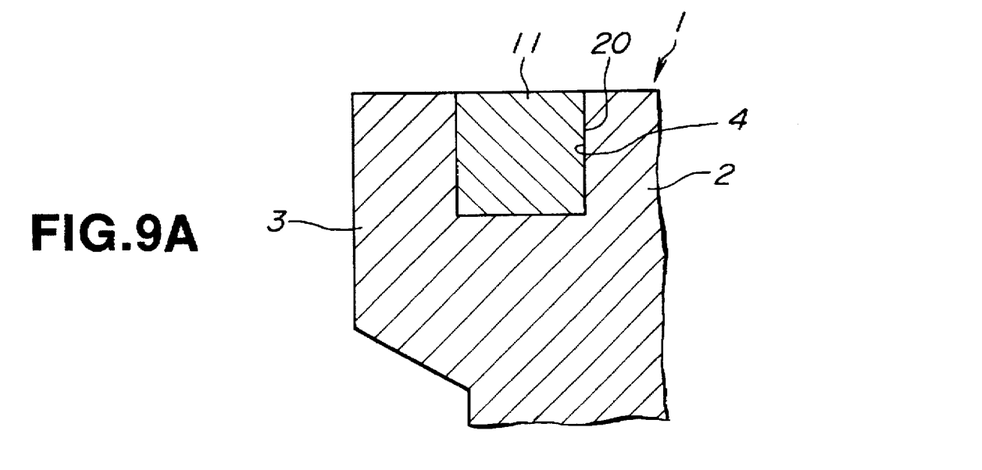
FIG. 9A is a view similar to FIG. 6B, showing the piston in FIG. 8, with the wear resisting annulus before remelting.
Figure 9B:
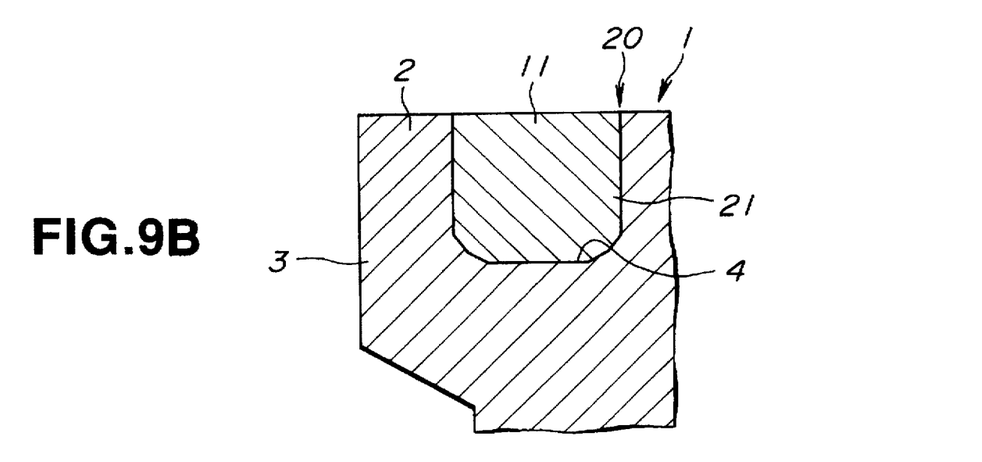
FIG. 9B is a view similar to FIG. 9A, showing a remelted interface between the wear resisting annulus and the piston main body.
Figure 9C:
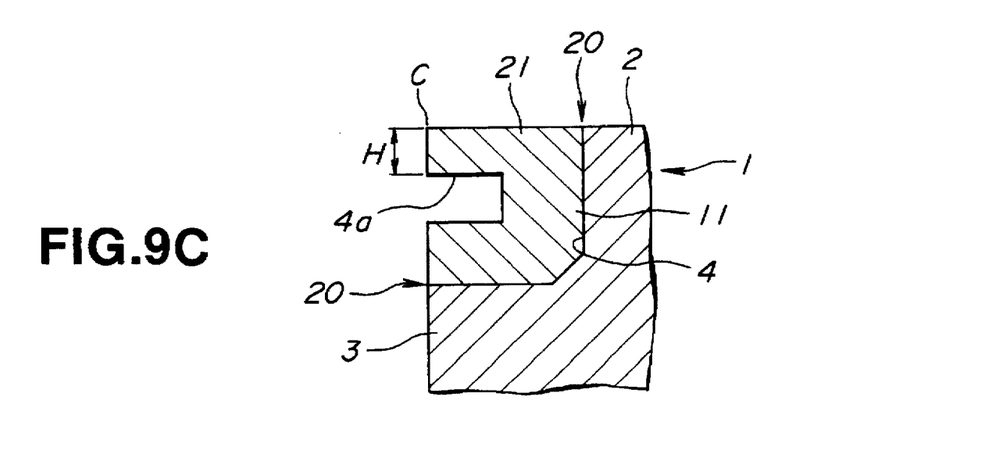
FIG. 9C is a view similar to FIG. 9B, showing the piston with an outer periphery of the top land cut off, and the top ring grove formed in the wear resisting annulus.

FIGS. 8–9C show a third embodiment of the present invention wherein the wear resisting annulus 11 is exposed at the crown 2 of the piston main body 1 to minimize a top land height H.

Specifically, after casting the wear resisting annulus 11 within the crown 2 of the piston main body 1 as shown in FIG. 4A, a top of the crown 2 is cut off to expose the upper side of the wear resisting annulus 11 as shown in FIGS. 8 and 9A. Then, as shown in FIG. 9B, from above the crown 2, a high energy electron beam is irradiated to the wear resisting annulus 11 and the interface 20 for remelting. The remelted portion 21 is cooled and solidified, joining the wear resisting annulus 11 and the piston main body 1. Subsequently, as shown in FIG. 9C, the outer periphery of the ring land 3 is cut off to expose the outer peripheral surface of the wear resisting annulus 11. Finally, the ring groove 4a is formed in the outer peripheral surface of the wear resisting annulus 11.

Thus, according to the third embodiment, not only the top land height H can be reduced as much as possible, but a corner C of the crown 2 has largely improved strength since it is formed by the wear resisting annulus 11, producing an advantage in power up of the engine.

In that case, the interface 20 between the wear resisting annulus 11 and the piston main body 1 is exposed on the upper side of the crown 2 which is subjected to intense heat. However, this corresponds to the remelted portion 21 with great joining strength, resulting in sure prevention of a phenomenon of separation between the two. That is, in the above prior art 6) or when the wear resisting annulus and the piston main body are joined through Ni-resist cast iron as alfin-treated, separation may occur at the interface as failing to resist thermal stress produced at the crown, whereas in this embodiment, such phenomenon of separation can surely be avoided.

The results of examinations on characteristic variations will be described with regard to strength, wear resistance, micro-welding resistance, and machinability of the interface 20 of the wear resisting annulus 11 formed through the above process.

Figure 13:
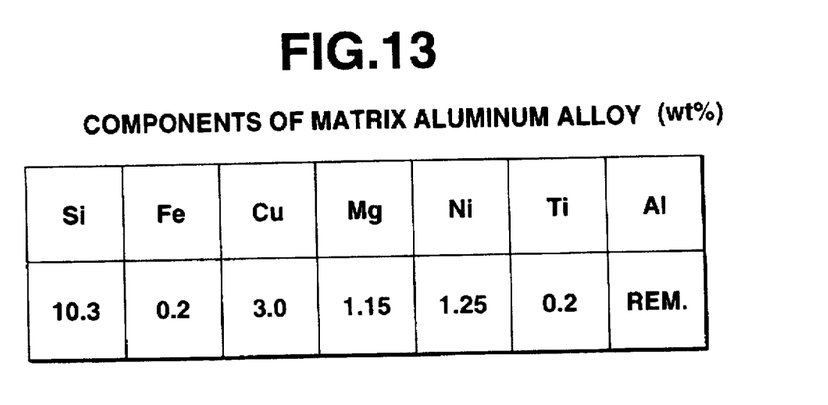
FIG. 13 is a table illustrating components of matrix aluminum alloy.

FIG. 13 shows components of matrix aluminum alloy. In the examinations, samples made according to the casting method were used. The additional amount of SiC particulates was evaluated on seven samples of 0, 5, 10, 15, 20, 25, and 30% by weight.

Figure 10:
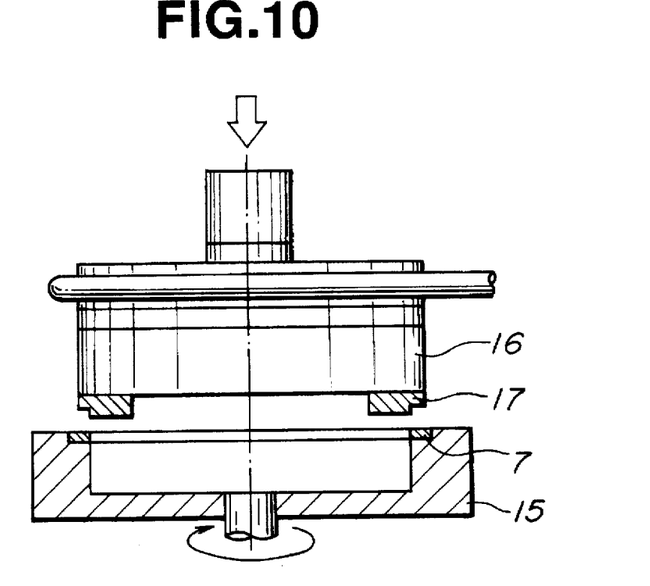
FIG. 10 is a view similar to FIG. 3, showing a testing device for wear resistance.

An evaluation method of wear resistance used an apparatus as shown in FIG. 10. Specifically, the piston ring 7 is fixed on a rotary bed 15 rotated by a motor (not shown). A test piece 17 fixed at a lower end of a heater 16 is pressed against an upper portion of the piston ring 7 for abrasion. This test piece 17 is a part of the wear resisting annulus 11 cut out of the ring groove of the piston main body 1. In this method, test conditions such as temperature, lubrication, etc. are established to be correlative with the piston of the real engine. An evaluation is carried out on the depth of wear after examination.

Figure 11:
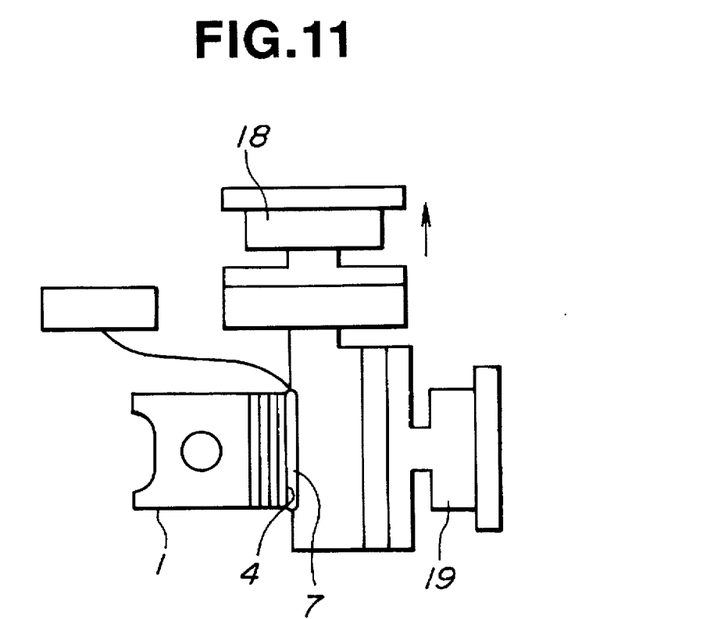
FIG. 11 is a view similar to FIG. 10, showing a testing device for micro-welding resistance.

An evaluation method of micro-welding resistance used an apparatus as shown in FIG. 11. Specifically, an acceleration test method is adopted in which the piston ring 7 is pressed against an underside of the top ring groove 4 of the piston main body 1, and is slid only in one direction as indicated by an arrow in FIG. 11 through actuators 18, 19. An evaluation is carried out on a rate of a welded and worn area of the top ring groove 4 to a slide area of the piston ring 7.

An evaluation of machinability was carried out such that a cylindrical rough section of 70 mm diameter is machined in the following conditions, and the total machining time until a tool has a wear amount of 0.3 mm is measured:

Machining velocity: 200 m/min

Cut amount: 0.3 mm

Feed amount: 0.08 mm/rotation

Tool used: gas-phase synthetic diamond tool manufactured by Asahi Daiya Co., Ltd.

Figure 14:
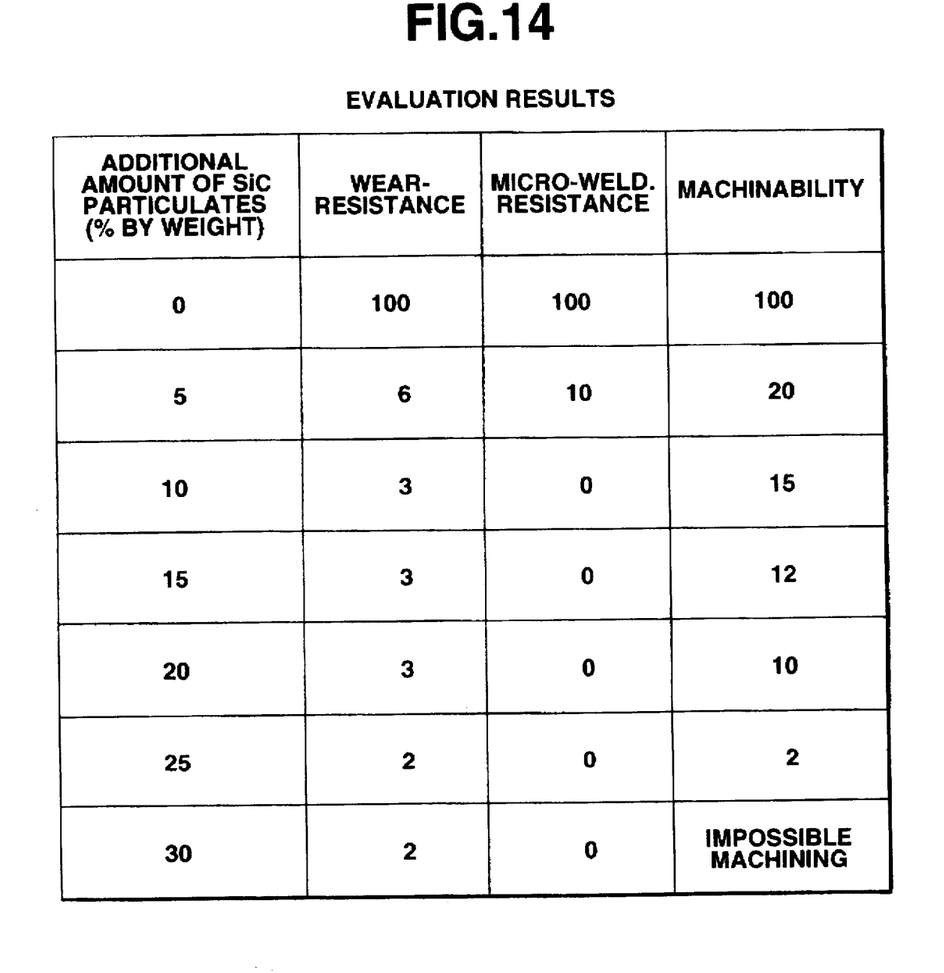
FIG. 14 is a view similar to FIG. 13, illustrating evaluation results.

FIG. 14 shows results of the above evaluations.

Referring to FIG. 14, wear resistance is given by a rate when the wear amount is determined at 100 without SiC particulates added (0% by weight). A smaller value indicates smaller wear.

Micro-welding resistance is given by a rate when a welded area is determined at 100 without SiC particulates added (0% by weight). A smaller value indicates smaller micro-welding.

Machinability is given by a tool life with respect to 100 when the rough sections without SiC particulates added are machined by using a sintered diamond tool COMPAX manufactured by General Electric Co., Ltd. It is to be noted that the rough sections with SiC particulates added are machined by the gas-phase synthetic diamond tool.

As seen from the table in FIG. 14, even when the additional amount of SiC particulates is 5% by weight, wear resistance is largely improved as compared with a case without addition. At 10% by weight, an effect of addition becomes substantially constant.

Micro-welding resistance shows a similar tendency. Even when the additional amount of SiC particulates is 5% by weight, micro-welding resistance is remarkably improved as compared with a case without addition. At 10% by weight or more, there is no occurrence of micro-welding.

As for machinability, even when the additional amount of SiC particulates is 5% by weight, machinability deteriorates as compared with a case without addition. Moreover, with an increase in the additional amount, machinability gets worse, and at 30% by weight, the tool has an edge broken, falling in impossible machining.

The above examinations reveal that the optimum additional amount of SiC particulates is in a range of 5 to 25% by weight, preferably, 10 to 20% by weight.

Moreover, an operation test was carried out with regard to the piston having the piston main body 1 of aluminum alloy which was cast around the wear resisting annulus 11, the piston being built in the internal combustion engine. The additional amount of SiC particulates in the wear resisting annulus 11 was set at 10% by weight. Additionally, for comparison, an operation test was carried out with regard to a piston with a piston having a piston main body without the wear resisting annulus 11.

Operation conditions are as follows: A four-cylinder 1,600 cc-displacement gasoline engine is used, and subjected to 100 hours continuous running at a 150° C. oil temperature and a 120° C. coolant temperature.

Results are such that the piston without the wear resisting annulus 11 suffers 50 μm abrasion and produces micro-welding on 85% of the underside of the top ring groove, while the piston with the wear resisting annulus 11 suffers neither abrasion nor micro-welding.

Figure 12:
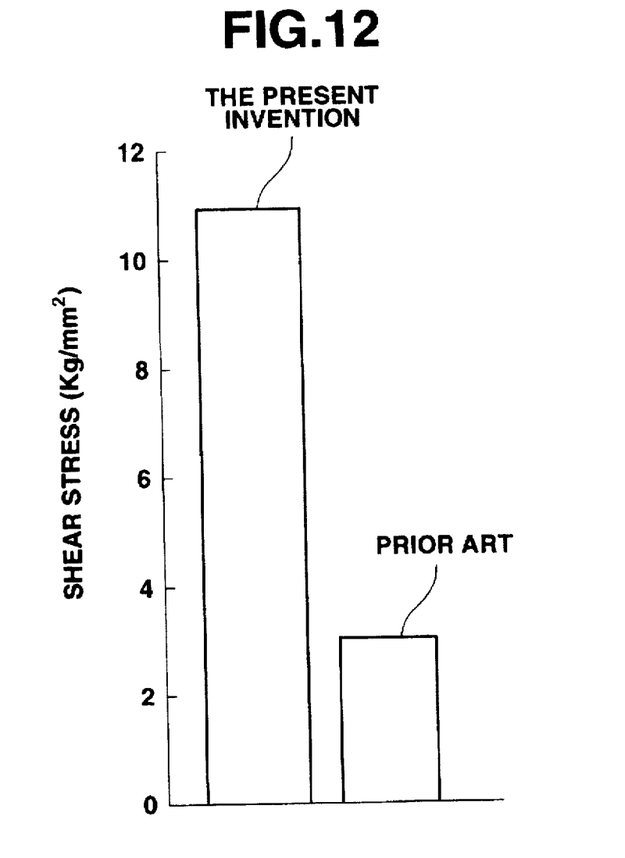
FIG. 12 is a bar graph illustrating shear strength of the piston according to the present invention and that of the conventional piston.

Moreover, referring to FIG. 12, for comparison with shear strength of a joined portion of the wear resisting annulus of Ni-resist cast iron as alfin-treated and the piston main body as described in connection with the prior art 6), an examination was carried out on shear strength of a joined portion of the wear resisting annulus 11 with 10% by weight of SiC particulates and the piston main body 1. FIG. 12 reveals that shear strength of the present invention has four times or more as large as that of the prior art 6).

Figure 16:
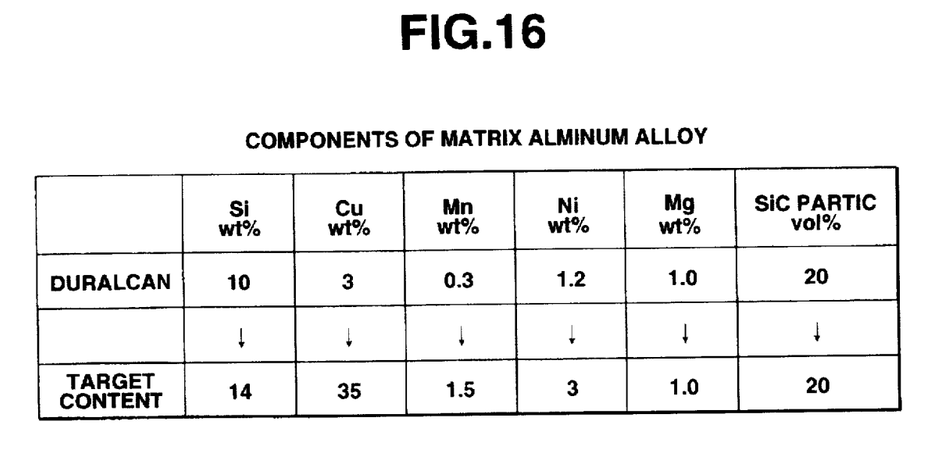
FIG. 16 is a view similar to FIG. 14, illustrating components of matrix aluminum alloy.

FIG. 16 shows a fourth embodiment of the present invention wherein components of matrix aluminum alloy of the wear resisting annulus 11 differ from those in the first to third embodiments, and the content of each component is optimized in the remelted portion as will be described later.

Specifically, as for the wear resisting annulus 11, an aluminum alloy ingot containing SiC particulates of 20% by volume is melted, which is maintained at approximately 740° C. The aluminum alloy, ingot contains the same components as those of an ingot commercialized by the name of DURALCAN F3K.20S-5, and has Cu, Ni, Mn, and Si further added in the form of matrix alloy or pure metal to obtain target contents thereof as shown in FIG. 15. It is noted that addition is carried out in the form of wire as to Cu, powder or wire as to Ni, Al-60 Mn matrix alloy as to Mn, and Al-40 Si matrix alloy as to Si.

If the content of hard particulates is determined as shown in FIG. 15, dispersion of hard particulates in matrix aluminum alloy is optimized in view of an improvement of wear resistance thereof. Moreover, hard particulates serve to fix crystal dislocation of matrix aluminum alloy, producing effects such as improved creep characteristic and stress corrosion cracking resistance, decreased coefficient of thermal expansion, and increased Young's modulus, fatigue strength, wear resistance, and micro-welding resistance.

However, if the content of hard particulates with respect to matrix aluminum alloy is smaller than 0.5% by weight, not only wear resistance is not improved, but the extent of an improvement of Young's modulus and a reduction in coefficient of thermal expansion are lowered. On the other hand, if the content of hard particulates is greater than 15.0% by weight, a counterpart member suffers increased wear.

The reason to add the components and determine the content thereof as shown in FIG. 15 is as follows:

a) Si

Si produces an effect of increasing wear resistance, Young's modulus and coefficient of thermal conductivity, and decreasing coefficient of thermal expansion. However, if the content of Si is smaller than 7.0% by weight, the above effect cannot be obtained, whereas if the content thereof is greater than 28.0% by weight, castability and machinability are deteriorated, resulting in easy occurrence of cracking.

b) Cu

Figure 17:
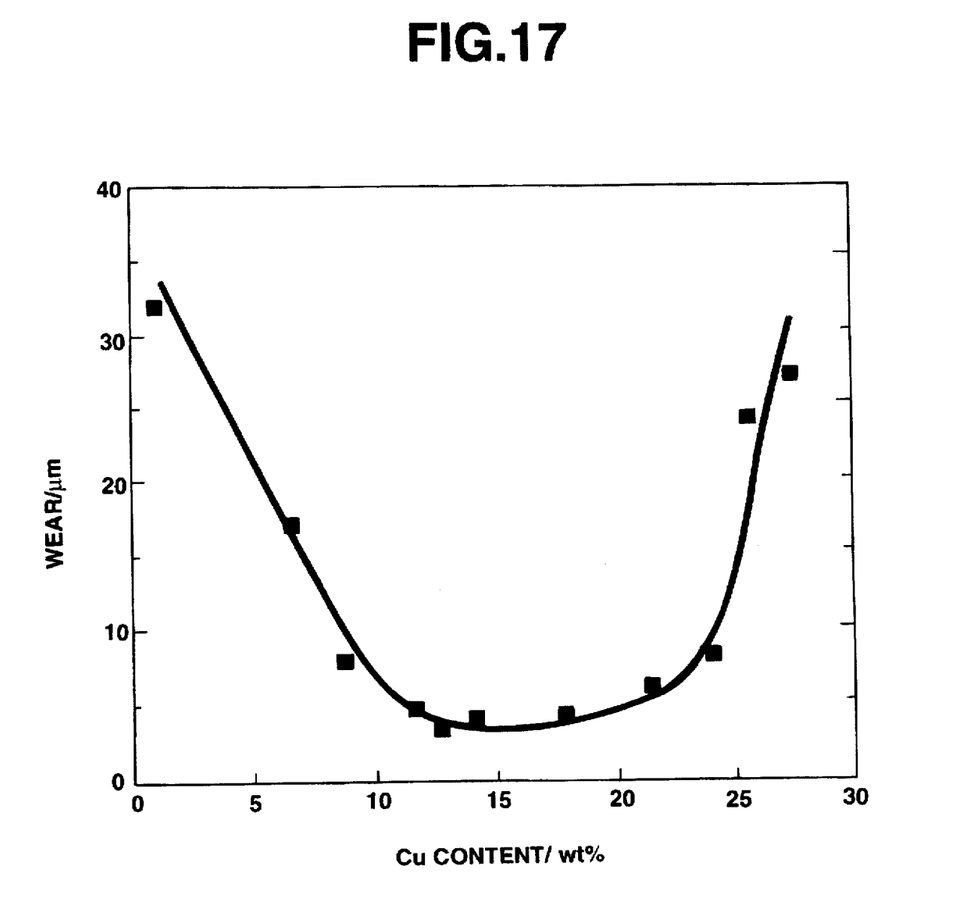
FIG. 17 is a characteristic curve showing a variation of Cu content vs. wear.

Cu serves to reinforce matrix aluminum alloy by forming intermetallic compound, producing an effect of improving wear resistance and micro-welding resistance. However, if the content of Cu is smaller than 10.0% by weight, the above effect cannot be obtained, whereas if the content thereof is greater than 23.0% by weight, matrix aluminum alloy becomes very hard and fragile,. resulting in deteriorated wear resistance. Thus, the content of Cu was varied in the remelted portion to carry out an abrasion test. FIG. 17 shows a result of the test. An evaluation method of wear resistance used an apparatus as shown in FIG. 10. Specifically, the piston ring 7 is fixed on the rotary bed 15 rotated by the motor (not shown). The test piece 17 fixed at the lower end of the heater 16 is pressed against the upper portion of the piston ring 7 for abrasion. The test piece 17 is a part of the wear resisting annulus 11 cut out of the ring groove of the piston main body 1. In this method, test conditions such as temperature, lubrication, etc. are established to be correlative with the piston of the real engine. An evaluation is carried out on the depth of wear after examination.

c) Mg

Mg produces an effect of reinforcing matrix aluminum alloy through heat treatment in the same way as Cu. However, if the content of Mg is smaller than 0.3% by weight, the above effect cannot be obtained, whereas if the content thereof is greater than 3.5% by weight, not only stress corrosion cracking resistance is deteriorated, but hot forgeability is lowered.

d) Mn

Mn serves to improve wear resistance and micro-welding resistance by forming intermetallic compound with Fe. However, if the content of Mn is smaller than 0.5% by weight, the above effect cannot be obtained, whereas if the content thereof is greater than 2.9% by weight, there appears a harmful influence such as deterioration of castability and machinability.

Thus, the content of each component in the wear resisting annulus 11 is previously regulated to be in the above corresponding range. After obtain the target content, molten alloy is agitated to make SiC particulates fully uniform therein. Then, molten alloy is injected into the metal mold to obtain the wear resisting annulus 11.

The wear resisting annulus 11 becomes difficult to be machined due to extreme hardness of matrix alloy after casting, and therefore, it is cast, preferably, in the near net shape.

The wear resisting annulus 11 is cast within the piston main body 1, and positioned to correspond to the top ring groove 4 in the same way as in the first to third embodiments. The casting condition is the same as those in the first embodiment.

After casting the wear resisting annulus 11 within the piston main body 1, the outer periphery of the ring land 3 is cut off, exposing the outer peripheral surface 11a of the wear resisting annulus 11. The interface 20 between the upper (lower) side of the wear resisting annulus 11 and the inner surface of the ring land 3 is irradiated and remelted by the high heat source such as a high energy electron beam.

The above are typical content values of the components obtained finally. That is, aluminum alloy of the remelted portion 21 contains: 7.0% by weight$\leq$Si$\leq$28.0% by weight, 10.0% by weight$\leq$Cu$\leq$23.0% by weight, 0.3% by weight$\leq$Mg$\leq$3.5% by weight, and 0.5% by weight$\leq$Mn$\leq$2.9% by weight.

It is noted that if matrix aluminum alloy of the piston main body 1 is AC8A, for example, the content of each component in the remelted portion 21 is smaller than the target content thereof: approximately 12.0% by weight as to Si, 20.0% by weight as to Cu, 1.0% by weight as to Mn, 2.0% by weight as to Ni, 1.0% by weight as to Mg, and 10.0% by weight as to SiC.

The content of each component in the remelted portion 21 is determined in such a way, preventing not only occurrence of a blow hole, but a reduction in the content thereof. That is, if the content of each component corresponds to that one as described in the fourth embodiment, a remaining of air between powder particulates and a reduction in the content of each component can be prevented, resulting in an improvement of wear resistance and micro-welding resistance.

Having described the present invention in connection with the preferred embodiment, it is noted that the present invention is not limited thereto, and various changes and modifications are possible without departing form the spirit of the present invention.

What is claimed is:

1. A piston for an internal combustion engine, comprising:
   a main body made of aluminum alloy;
   groove means for defining a plurality of piston ring grooves on an outer periphery of said main body;
   wear resisting means for resisting wear of said groove means, said wear resisting means being made of aluminum alloy containing predetermined particulates; and
   interface means for interconnecting said groove means and said wear resisting means, said interface means including surfaces of said groove means and said wear resisting means, said surfaces being remelted by a heat source and solidified.

2. A piston as claimed in claim 1, wherein said groove means are cast around said wear resisting means.

3. A piston as claimed in claim 2, wherein said groove means include a top ring groove.

4. A piston as claimed in claim 1, wherein said wear resisting means are in the form of an annulus.

5. A piston as claimed in claim 1, wherein said predetermined particulates of said wear resisting means include silicon carbide (SIC) particulates.

6. A piston as claimed in claim 5, wherein said SiC particulates correspond to 5 to 25% by weight.

7. A piston as claimed in claim 5, wherein said SiC particulates correspond to 10 to 20% by weight.

8. A piston as claimed in claim 1, wherein said heat source includes an electron beam of high energy density.

9. A piston for an internal combustion engine comprising:
   a main body made of aluminum alloy;
   groove means for defining a plurality of piston ring grooves on an outer periphery of said main body;
   an annulus disposed on said groove means for resisting wear of said groove means, said annulus being made of aluminum alloy containing predetermined particulates; and
   interface means for interconnecting said groove means and said annulus, said interface means including surfaces of said groove means and said annulus, said surfaces being remelted by a heat source and solidified.

10. A piston as claimed in claim 9, wherein said groove means include a top ring groove.

11. A piston as claimed in claim 9, wherein said predetermined particulates of said annulus include silicon carbide (SIC) particulates.

12. A piston as claimed in claim 11, wherein said SiC particulates correspond to 5 to 25% by weight.

13. A piston as claimed in claim 11, wherein said SiC particulates correspond to 10 to 20% by weight.

14. A piston as claimed in claim 9, wherein said heat source includes an electron beam of high energy density.

15. A method of manufacturing a piston for an internal combustion engine having a main body and at least one ring groove, the method comprising the steps of:
   forming a wear resisting annulus out of aluminum alloy containing predetermined particulates;
   casting molten aluminum alloy for the main body of the piston around said wear resisting annulus, said wear resisting annulus being positioned to correspond to the ring groove of the piston; and
   remelting and solidifying an interface between said wear resisting annulus and the main body of the piston.

16. A method as claimed in claim 15, wherein said predetermined particulates of said wear resisting annulus include silicon carbide (SiC) particulates.

17. A method as claimed in claim 16, wherein said SiC particulates correspond to 5 to 25% by weight.

18. A method as claimed in claim 16, wherein said SiC particulates correspond to 10 to 20% by weight.

19. A piston as claimed in claim 15, wherein said remelting and solidifying step is carried out with an electron beam of high energy density.

* * * * *